United States Patent
Alley

(10) Patent No.: US 8,998,757 B2
(45) Date of Patent: Apr. 7, 2015

(54) CHAIN CLEANER FOR CHAIN DRIVEN VEHICLE

(71) Applicant: David J. Alley, Lakewood, CO (US)

(72) Inventor: David J. Alley, Lakewood, CO (US)

(*) Notice: Subject to any disclaimer, the term of this patent is extended or adjusted under 35 U.S.C. 154(b) by 161 days.

(21) Appl. No.: 13/915,809

(22) Filed: Jun. 12, 2013

(65) Prior Publication Data
US 2014/0366305 A1 Dec. 18, 2014

(51) Int. Cl.
| F16H 57/00 | (2012.01) |
| B08B 1/00 | (2006.01) |
| B08B 1/02 | (2006.01) |
| B62J 31/00 | (2006.01) |
| F16H 57/04 | (2010.01) |

(52) U.S. Cl.
CPC . *B08B 1/005* (2013.01); *B08B 1/02* (2013.01); *B62J 31/00* (2013.01); *F16H 57/04* (2013.01)

(58) Field of Classification Search
CPC ... B27B 17/08; B62J 99/00; B62J 2099/0066; F16H 55/38
USPC ........................................................ 474/92
See application file for complete search history.

(56) References Cited

U.S. PATENT DOCUMENTS

| 299,403 | A | * | 5/1884 | Kingsley .......................... 474/92 |
| 317,603 | A | * | 5/1885 | Wilson et al. .................... 474/92 |
| 545,972 | A | * | 9/1895 | Polleys ............................ 474/92 |
| 556,733 | A | * | 3/1896 | Byrne ........................ 192/217.1 |
| 574,621 | A | * | 1/1897 | McCulloch et al. ............. 474/92 |
| 575,520 | A | * | 1/1897 | Grupelli .......................... 474/92 |
| 577,503 | A | * | 2/1897 | Ash ................................. 474/92 |
| 584,238 | A | * | 6/1897 | Reagan ........................... 474/92 |
| 602,000 | A | * | 4/1898 | Fay ................................. 474/92 |
| 603,654 | A | * | 5/1898 | Norris ........................ 144/242.1 |
| 604,429 | A | * | 5/1898 | Sise ................................ 474/92 |
| 606,482 | A | * | 6/1898 | Gallagher .................... 15/256.6 |
| 608,609 | A | * | 8/1898 | Kinnard .......................... 474/92 |
| 613,833 | A | * | 11/1898 | Baldwin ....................... 118/419 |
| 616,593 | A | * | 12/1898 | Stanbury, Jr. .................. 15/160 |
| 617,224 | A | * | 1/1899 | Conn ............................ 15/88.3 |
| 628,087 | A | * | 7/1899 | Gibford .......................... 474/92 |
| 635,778 | A | * | 10/1899 | Hudelson ....................... 474/92 |
| 648,724 | A | * | 5/1900 | Cole ............................... 474/92 |
| 1,299,324 | A | * | 4/1919 | Goodykoontz ............... 198/498 |
| 1,490,377 | A | * | 4/1924 | Freeman ........................ 474/92 |
| 1,720,137 | A | * | 7/1929 | Lunn ............................. 474/92 |
| 3,229,808 | A | * | 1/1966 | Olson .......................... 15/21.1 |
| 3,288,275 | A | * | 11/1966 | Bunting ....................... 198/498 |
| 3,612,258 | A | * | 10/1971 | Bagby .......................... 198/494 |
| 3,931,991 | A | * | 1/1976 | Marchello .................... 280/295 |
| 4,280,591 | A | * | 7/1981 | Newcomb ...................... 184/17 |
| 4,578,120 | A | * | 3/1986 | Chiarella ........................ 134/9 |

(Continued)

*Primary Examiner* — Henry Liu
(74) *Attorney, Agent, or Firm* — Scott L. Terrell, P.C.; Scott L. Terrell

(57) ABSTRACT

A chain cleaner capable of cleaning dirt and debris from the roller chain of a chain driven vehicle is provided. The chain cleaner is a polymer sheet. The sheet has a leading and a trailing edge, upper and lower surfaces, and a bilateral axis defining a chain line. The chain line extends from the leading to the trailing edge. A clear slot is positioned in the sheet adjacent to the trailing edge. The slot has a predetermined height and width which is at least equal to a respective height and width of the chain to be cleaned. The chain is thereby capable of biased directional travel against the lower and upper surfaces and through the slot, along the chain line when operating the chain drive of the vehicle. The chain cleaner includes an assembly for attaching the sheet to the vehicle adjacent to the leading edge.

19 Claims, 3 Drawing Sheets

(56) References Cited

U.S. PATENT DOCUMENTS

| | | | |
|---|---|---|---|
| 4,593,923 A * | 6/1986 | Thalmann | 280/261 |
| 4,827,555 A * | 5/1989 | Fruit et al. | 15/160 |
| 5,069,470 A * | 12/1991 | Spencer | 280/288.4 |
| 6,257,369 B1 * | 7/2001 | Pesl | 184/15.1 |
| 6,942,409 B2 * | 9/2005 | Barbieri | 401/10 |
| 8,181,747 B2 * | 5/2012 | Feldstein | 184/15.1 |
| 8,511,436 B2 * | 8/2013 | Feldstein | 184/15.1 |

\* cited by examiner

CHAIN CLEANER FOR CHAIN DRIVEN VEHICLE

CROSS REFERENCE TO RELATED APPLICATIONS

Pursuant to 35 U.S.C. 119(e), Applicant claims the benefit of U.S. Ser. No. 61/795,389, filed, pursuant to 35 U.S.C. 111(b), on 16 Oct. 2012.

BACKGROUND OF THE INVENTION

1. Field of the Invention

The present invention relates to chain driven vehicles. In particular, it relates to cleaners for removing accumulations of dirt and debris from vehicle chains and sprockets, while operating. More particularly, it relates to a bicycle chain cleaner for scraping dirt and debris from a bicycle chain while pedaling.

2. Background Art

Chain driven vehicles are well known for use in commercial, agricultural, recreational, and competitive activities. Off-road chain driven vehicles, which have gained wide acceptance in the industry, are often referred to as all-terrain-vehicles ("ATV"), motorcycles designed for trail and motocross, and mountain bicycles. While motor cycles and ATV's employ the use of transmissions to modify the gear ratios, with mountain bikes the gear ratios are manually changed using a derailleur system for moving the chain between sprockets.

The accumulation of dirt and debris on the chains of chain driven vehicles is a problem which is also well known in the art. This problem is exaggerated where such vehicles are designed primarily for off-road use. As a result, bicycle accessories have been designed to address the accumulation problem including various certain configurations of brush type cleaners which are adapted for cleaning the chains either before or after use, and cleaning solutions, which incorporate degreasing solvents and brushes contained within a plastic housing.

One such example discloses a solvent, brush and housing modified for attachment to a bicycle for cleaning the chain during use. There, U.S. Pat. No. 8,181,747, to Feldstein, discloses a chain cleaner assembly for cleaning and lubricating the chain of a bicycle while pedaling. The apparatus includes a housing for enclosing the sprocket chain on all sides. The housing consists of a mutually connectable upper half-shell and a lower half-shell portions and a securement assembly which includes a mounting plate adapted to attach to a rear wheel quick disconnect of the bicycle. The housing is suspended from the sprocket chain and provides a funnel shaped solvent hopper, a hose connection to a compressed air supply, and an air knife adapted to direct high velocity air to impinge upon and thereby dry the sprocket chain.

In another example, U.S. Pat. No. 7,641,042, to Andrews, discloses a drive chain brush cleaner. There, an inverted coil brush assembly has an open coil structure with a long lead and can be threaded on and removed from a belt or chain. The tool is sufficiently elastic so that the axial hole (ID) through its center can be enlarged or contracted by axial elongation or compression of the tool. The tool and its use enable it to be used as a hand tool or as a component in a transmission.

While the foregoing cleaners offer some utility, in the first instance the cleaner assembly appears to be relatively complex in design, heavy, and would be difficult to avoid breaking while riding on trails with rocks, water, and fallen trees. Moreover, such a device would be difficult to maintain, not easily transportable, and would probably exhibit a relatively high degree of frictional force on the chain. The helical brush, of the second disclosure, while desirably simple in design does not appear suitable for use in retrofit applications with a derailleur system, would likely trap dirt and debris within the helical portion under off-road use conditions, and would also probably break under extreme off-road use. Therefore, what is needed is a pocket-sized chain cleaner which is simple in design, light weight, frictionless, easily installed in retrofit applications, or under actual trail riding conditions, and is low cost, but which efficiently scrubs accumulations of dirt and debris from the upper, lower and lateral surfaces of a chain when used under actual operating conditions. The present invention satisfies these needs.

SUMMARY OF THE INVENTION

It is therefore an object of the present invention to provide a chain cleaner for scrubbing accumulations of dirt and debris from the chain of a chain driven vehicle.

It is another object of the present invention to provide a lightweight bicycle chain cleaner which is simple in design, pocket sized, easily installed for retrofit application, capable for use under actual trail riding conditions, and low in cost, but which effectively scrubs accumulations of dirt and debris from the upper, lower, and lateral surfaces of a bicycle chain when pedaling.

To overcome the problems of the prior art and in accordance with the purpose of the invention, as embodied and broadly described herein, briefly, a chain cleaner capable of cleaning accumulations of dirt and debris a roller chain of a chain driven vehicle is provided. The chain cleaner is preferably an elastic polymer sheet. The sheet has a leading and a trailing edge, upper and lower surfaces, and a bilateral axis defining a chain line. The chain line extends from the leading to the trailing edge. A clear slot is positioned in the sheet adjacent to the trailing edge. The slot has a predetermined length and width which is at least equal to a respective height and width of the chain to be cleaned. The chain is thereby capable of travel from the lower and upper surface of the sheets, and through the slot, directionally along the chain line when operating the chain drive of the vehicle. Adjacent to the leading edge of the sheet is an assembly for pivotally attaching the sheet to the vehicle in axial alignment with the chain line.

Additional advantages of the present invention will be set forth in part in the description that follows and in part will be obvious from that description or can be learned from practice of the invention. The advantages of the invention can be realized and obtained by the apparatus particularly pointed out in the appended claims.

DESCRIPTION OF THE DRAWINGS

The accompanying drawings, which are incorporated in and which constitute a part of the specification, illustrate at least one embodiment of the invention and together with the description explain the principles of the invention.

DESCRIPTION OF THE PREFERRED EMBODIMENT

Figure 1:
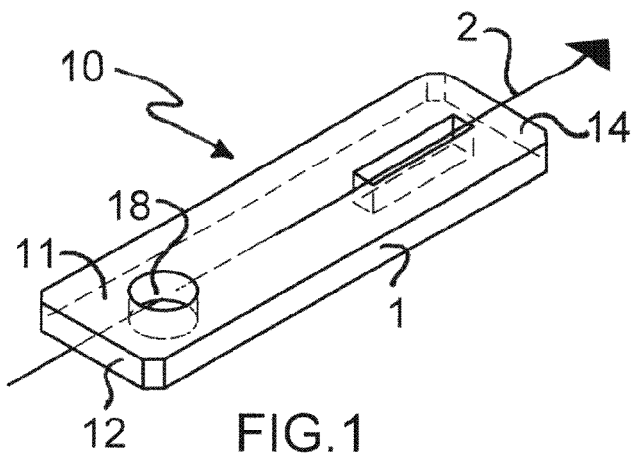
FIG. 1 is a perspective top view of the general embodiment of the chain cleaner according to the present invention.

Unless specifically defined otherwise all technical or scientific terms used herein have the same meaning as commonly understood by one of ordinary skill in the art to which this invention belongs. The ends of the roller chains used to propel chain driven vehicles are connected to form a loop around the sprockets. Where the loop is hypothetically configured to define a perfect circle, the loop includes an inner and an outer diameter. The difference between the inner and the outer diameter is established by the "height", as used herein, of the exterior side plates of the roller chain. Consistent therewith, and for purposes of the following description and claims, the term "height" is that measurement of an exterior side plate of the roller chain equal to the difference between the inner and outer diameters of the circle.

Although any methods and materials similar or equivalent to those described herein can be used in the practice or testing of the present invention, the preferred methods and materials are now described. Reference will now be made in detail to the presently preferred embodiments of the invention examples of which are illustrated in the accompanying drawings wherein like numerals represent like features.

Referring now to the drawings figures, the chain cleaner 10 is capable of scrubbing accumulations of dirt and debris from the roller chain 26 of a chain driven vehicle, such as a bicycle. The chain cleaner 10 is desirably formed of an elastic polymer sheet 1 having a leading 12 and a trailing edge 14, upper 11 and lower 13 surfaces, and a bilateral axis defining a chain line 2. The chain line 2 extends from the leading 12 to the trailing 14 edge.

A clear slot 16 is positioned in the sheet 1 adjacent to the trailing edge 14. The slot 1 is configured with a predetermined dimension which includes a length, in axial alignment with the chain line, and a width which is approximately equal to or slightly greater than a respective height, and width of the chain 26 to be cleaned. It can be appreciated that the dimensions of the slot are critical to the cleaning action, in use. The roller chain 26 is thereby capable of travel directionally along the chain line 2, but biases against the lower 13 and upper 11 surfaces of the sheet 1, when traveling through the slot 16, so that the upper, lower, and lateral surfaces of the chain 26 are scrubbed clean of foreign dirt and debris which accumulate when operating the chain drive under dirty conditions. With use, as the cleaner wears, the respective trailing and leading inner sidewalls of the slot begin to taper and conform in a shape which is consistent with the side plates and rollers of the chain. Testing has shown that this wear pattern, or conformation in shape, actually enhances the cleaning action of the present invention over time.

Testing of the present invention 10 has been conducted in the form of bench testing, and over 120 Km of actual trail riding. The results of this testing and development have demonstrated that the preferred substrate material for use in making the sheet 1 is a fluoropolymer, and more particularly it is desirably to use Polytetrafluoroethylene ("PTFE") as the sheet substrate. PTFE is an elastic chemical formulation including a synthetic fluoropolymer of tetrafluoroethylene The best known brand name of PTFE is TEFLON by E.I. DuPont Co. PTFE is a fluorocarbon solid, and demonstrated during testing the necessary hydrophobic properties, where neither water nor water-containing substances where capable of wetting the sheet 1, was necessarily elastic, highly abrasion resistant, but which also demonstrated the necessarily lowest coefficients of friction. Thus, use of the PTFE substrate as a starting material for the sheet 1 has been empirically determined as the best suitable material because hydrophobicity, abrasion resistance, low friction, and durability are, in combination, the dominant physical characteristics which are necessary to the utility of the present invention.

As illustrated in the drawing figures, the preferred embodiment of the present invention is made for use with a bicycle roller chain 26 used to connect the pedal cranks of the bicycle to the rear wheel. The slot 16 in the sheet 1 is preferably cut or stamped into the sheet 1 with respect to a predetermined size chain 26 size. Here, chain 26 size is specified by pitch and width. Pitch is the distance between rollers (½" on all modern bicycle chain). Here, "width" is the external width of the chain. Chains for derailleur applications also come in various external widths. Newer clusters which have more sprockets use chains with thinner side plates and with rivets whose ends are flush with the side plates.

A bicycle chain comes in four basic interior widths: (1) 4.76 mm, 25.4 mm pitch, used until the middle of the 20th century on many bicycles; (2) 3.18 mm chain is used on most single-speed bicycles, and bicycles with internal gearing; (3) 2.30 mm chain is used on derailleur equipped bicycles that have more than 3 cogs at the rear; and (4) even a somewhat narrower chain, typically 2.29 mm between the inner plates, is used for derailleur-equipped bicycles with 10 or more sprockets at the rear. Thus, the slot 16 in the sheet 1 is cut or stamped for use with any of the predetermined interior width(s) plus the thickness of the side plates 20 of the cage to establish the predetermined width dimension of the slot 16 so that the slot 16 effectively guides and cleans the chain 26.

The sheet 1 is pivotally attached to the vehicle at point which is adjacent to the leading edge 12 so that the cleaner 10 floats, or articulates upwards and downwards, when traveling in biased axial alignment with the chain line 2. The sheet 1 preferably includes an aperture 18, such as a clear hole, which is capable of receiving a tape 21, or fastener, to attach the sheet 1 to the vehicle so that it pivots, or floats, in an articulating manner up and down. It may be appreciated that the cleaner 10 according to the present invention may easily be flipped over, where the trailing edge becomes the leading edge, after a period of prolonged use, and then reattached to so as to prolong the life of the cleaner 10. The aperture 18 may also be configured as a second of said slots 16 which is also capable of receiving the chain 26 in biased directional travel along the chain line 2 (not shown). In this manner, the cleaner such as a clear hole 10 is adapted to include two slots 16 for use in cleaning the chain 26, in biased travel along the chain line 2, so that the sheet 1 may be flipped over, leading 12-to-trailing 14 edge, after periods of prolonged or extreme use so that the slots 2 are rotated with respect to the chain line for use in prolonging the life of the cleaner. Where the cleaner 10 is embodied where the aperture 18 is a second slot is may be appreciated that the first and second slots may, but need not, be configured as differently dimensioned so that each is adapted to receive a differently sized chain. For, example, the first slot 2 may be of a dimension to accommodate a 10 speed chain whereas the aperture 18 when configured as a second slot maybe adapted to receive an 11 speed chain.

Again, road testing has demonstrated that the preferred element for attachment is a sturdy nylon tape 21 threaded through the clear hole 18 and around a horizontal brace connecting side plates 20 of the derailleur cage, or bracket 30, positioned adjacent to a rear sprocket 23 or tension pulley 24, so that the sheet 1 pivots, or floats, up and down while cleaning a chain 26 traveling along the chain line 2. The preferred material is a nylon cable tie 21 which consists of a tape section with triangular teeth that slope in one direction. The head of the cable tie has a slot with a flexible pawl that irreversibly rides up the slope of these teeth when the tape is inserted. The pawl engages the backside of these teeth to stop removal of the tape.

Figure 6:
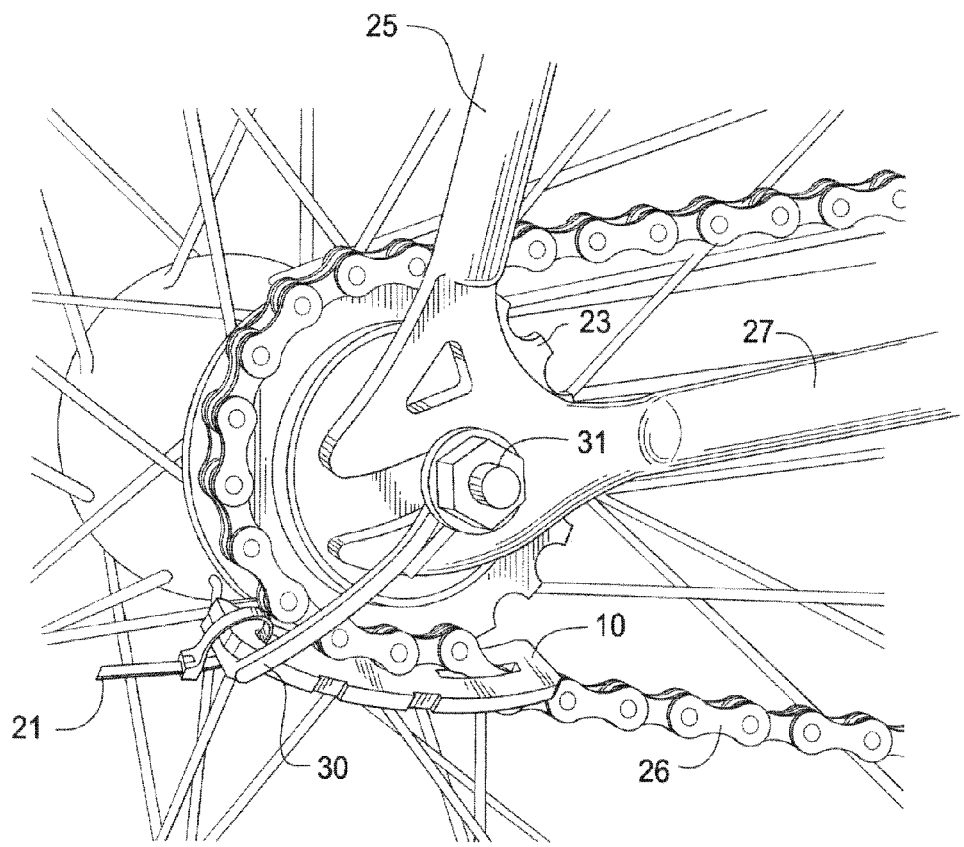
FIG. 6 is a right side view showing the present invention attached to the hub of a single speed bicycle where the attachment assembly further includes a generally U-shaped bracket, axel nut, and nylon tape.

The cleaner 10 may also be attached using a pin, rivet, bolt, or bracket 30 either as a retro fit assembly to an existing bicycle, or as an original equipment manufacturer assembly having a fixed attachment point which is adjacent the leading edge 12, but not both edges, for connecting the cleaner 10 so long as the sheet 1 is capable of pivotal attachment adjacent the leading edge so that the trailing edge floats vertically. FIG. 6 illustrates the use of a U-shaped bracket 30 for attachment where the bracket 30 is attached at the rear axle of a single speed bicycle, where the seat 25 and chain 27 stays converge, with the nut 31 used to fasten the rear wheel to the frame. Here, the bracket 30 is formed in a configuration which is similar to the construction of a derailleur cage so that the bracket 30 includes a transverse brace for supporting and attaching the leading edge 12 of the cleaner 10 in axial alignment with the chain line 2. The cleaner 10 is attached to the transverse portion of the bracket 30 with a nylon tape tie 21 threaded through the clear hole 18. Thus, with this embodiment, the attachment element of the present invention includes the clear hole 18, nylon tape 21, bracket 30, frame and axle nut 31.

FIG. 1 illustrates the general configuration of the present invention in an embodiment which has been tested and found to be extremely durable in use, but which requires separation of the roller chain 26 links, using a chain tool, for insertion of one end of the chain 26 through the slot 16 and then reconnecting the separated links to complete installation. However, referring now to FIGS. 2 and 3, where it is shown a second embodiment of the present invention, the chain cleaner 10 may also be configured to elastically separate bilaterally to insert a chain 26 into the slot 16 without separating the roller links during installation. This embodiment is conceptually preferred where one desires to use the cleaner 10 under less demanding applications, for temporary applications, or when one simply desires to avoid having to separate the roller links of the chain 26 for installation.

Figure 2:
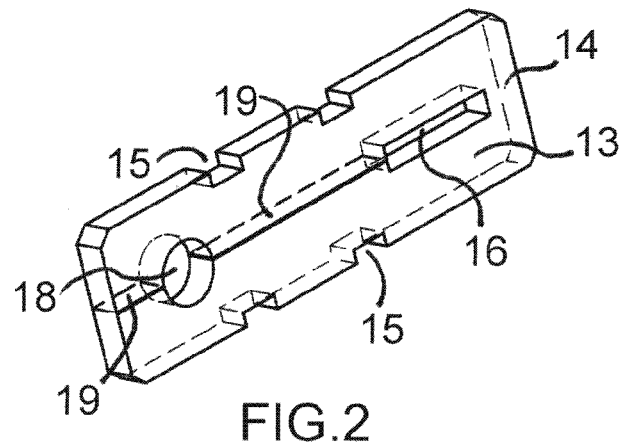
FIG. 2 is a perspective bottom view of a preferred embodiment of the chain cleaner where the sheet is elastic and includes a slit formed so that the sheet is capable of separation.
Figure 3:
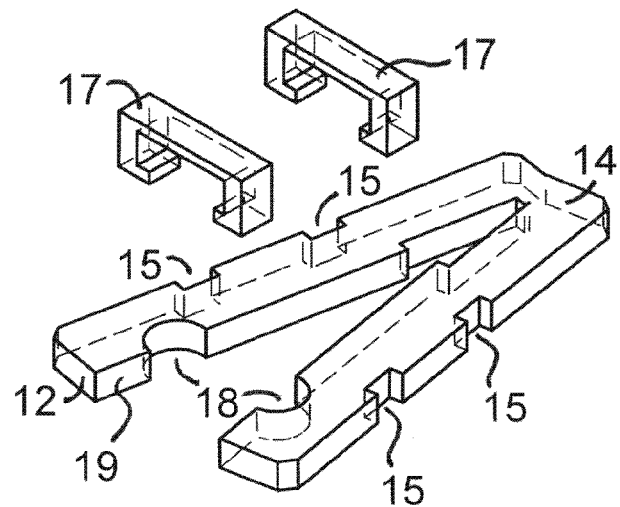
FIG. 3 is a perspective top view of the embodiment shown in FIG. 2 which illustrates a Y-shaped separation of the sheet for insertion of a chain into the slot, retention clips for fixing the chain in the slot, after insertion, and recesses in the side walls of the sheet for securing the clips.

As shown in FIGS. 2 and 3, the sheet 1 is adapted with a through, or clear, slit 19 positioned to provide a bilateral elastic separation of the sheet 1, along the chain line 2, so that the chain 26 is capable of being inserted in the slot 16 through the slit 19 when separated. With this embodiment, it is also desirable to include, as an element of the chain cleaning device 10, at least one, but preferably two, transverse retainer clip(s) 17, or clamp(s), capable of transverse bias against the upper surface 11 of the sheet 1 in order to retain the separation in a fixed non-separated position (FIG. 2) so that the chain 26 is capable of secured travel along the chain line 2 within the slot 16. Where the preferred attachment point is with a clear hole 18, positioned adjacent the leading edge 12 of the sheet 1, it is preferred that the slit 19 is cut to extend along said chain line 2, axially, from a proximal edge of the clear hole 18 through the trailing edge 14 of the sheet 1 so that the sheet 1 is capable of a Y-shaped separation.

As illustrated in FIG. 3 the slit 19 is adapted to generate the Y-shaped elastically compressed separation for installation of the chain 26 in the slot 16. The retaining clips 17, or clamps, are of a generally C-shaped configuration. Here, it is also desirably to form recesses 15 in side walls of the sheet 1 for receiving the clamping edge of the clip 17, or clamp, and also providing perpendicular flanged portions at the terminus of the clamping edge to further compress the clip 17 against the upper surface 11 of the sheet 1.

Figure 4:
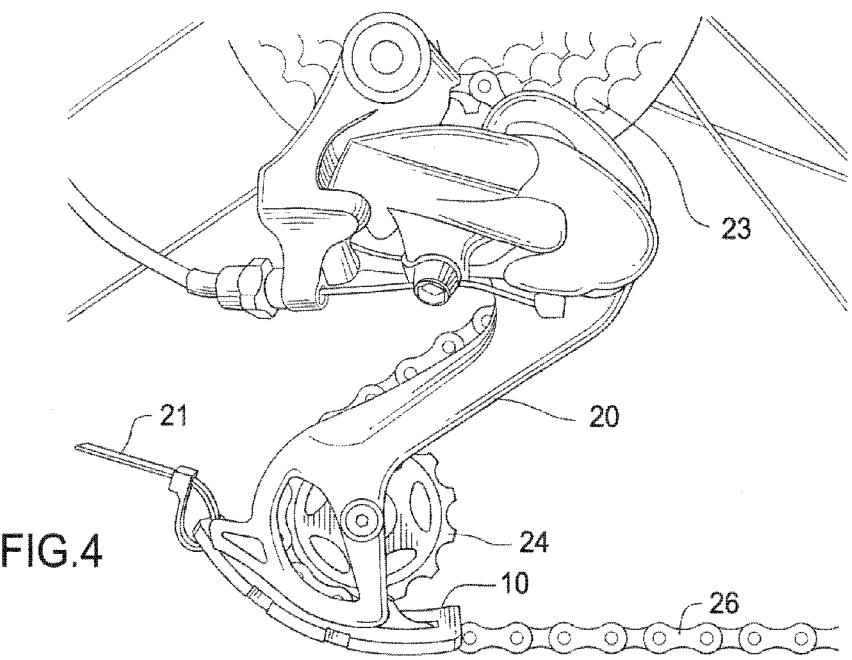
FIG. 4 is a right side view showing the present invention attached to a mountain bike derailleur cage at a position which floats vertically below, and in relation to, the tension pulley.
Figure 5:
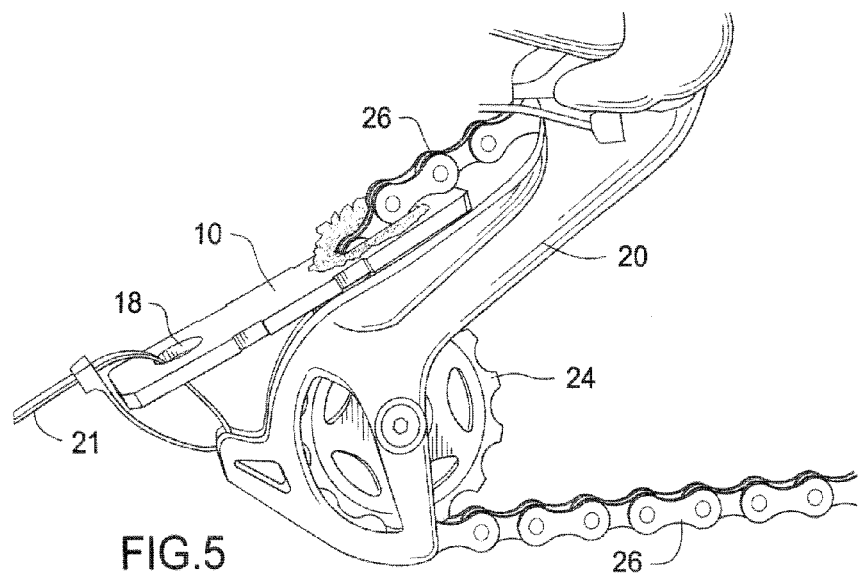
FIG. 5 is a right side view showing the present invention attached to a mountain bike derailleur cage at a position which floats vertically above, and in relation to, the tension pulley.

Referring now to the drawing FIGS. 4 and 5, in use, the preferred embodiment of the present invention is adaptable for original equipment manufacture or retrofit application with a mountain or cross bicycle. In this manner, the bicycle typically includes a plurality of rear sprockets 23, in a cassette arrangement, and a derailleur assembly. The derailleur is mechanism for moving the chain from one sprocket to another to change gears on a multi-speed bicycle. A typical derailleur consists of a parallelogram which moves a cage. The cage means that part of the derailleur through which the chain 26 passes. The cage includes an inner and an outer cage plates 20. The cage plates 20 are connected by a transverse brace, typically orientated in parallel alignment with the axel of the tension pulley 24 so that a rectangular supporting structure is formed to include the axel, brace and lateral plates 20 of the cage. The jockey pulley 22 is the upper pulley on a rear derailleur. This is the pulley that actually guides the chain from one sprocket to another. The tension pulley 24 is the lower pulley on a rear derailleur. The tension pulley 24 is adapted to adjust the tension on the chain as different-sized sprockets 23 are selected.

A Sprocket is a toothed wheel or gear that is part of a chain drive. As used herein the term refers to the rear sprockets 23. The rear sprockets 23 individually are also commonly called cogs or gears, and as a group may also be referred to as a block, cassette, cluster or freewheel.

Here, the derailleur includes a lower tension pulley 24 adapted to adjust a tension on the chain 26 as different-sized sprockets 23 are selected and said sheet 1 is attached to said derailleur cage in a spaced relationship above said tension pulley 24. When used for fitment with a bicycle having a derailleur the chain cleaner 10, according to the present invention, is preferably attached with the nylon tape 21 through the attachment point and to the transverse brace connecting the derailleur cage plates 20 in a spaced relationship to articulate at the tension pulley 24. Maintaining the spaced relationship to the tension pulley 24 is an empirically derived element of the preferred embodiment so that the cleaner 10 is capable of low friction bias. As shown in the drawing figures, the attachment point of the sheet 1, with respect to the derailleur and tension pulley 24, is either above or below the respective position of the tension pulley 24.

While the present invention has been described in connection with the illustrated embodiments, it will be appreciated and understood that many modifications may be made without parting from the true spirit and scope of the invention.

I claim:

1. A Chain Cleaner capable of cleaning accumulations of dirt and debris from the roller chain of a chain driven vehicle, comprising:

(a) a polymer sheet having a leading and a trailing edge, upper and lower surfaces, and a bilateral axis defining a chain line extending from said leading to said trailing edge;

(b) a clear slot positioned in said sheet adjacent to said trailing edge, said slot having a length and a width at least equal to a respective height and width of the chain to be cleaned so that said roller chain is capable of biased directional travel against said lower and upper surfaces, through said slot, along said chain line so that the upper, lower, and lateral surfaces of the chain are cleaned of the dirt and debris; and (c) a means for pivotally attaching said leading edge of said sheet to said vehicle in axial alignment with said chain line so that said trailing edge of said sheet is capable of floating vertically in relation to said chain while said chain travels through said slot along said chain line.

2. The Chain Cleaner according to claim 1, wherein said elastic polymer comprises a fluoropolymer.

3. The Chain Cleaner according to claim 1, wherein said means for attaching comprises an assembly including an aperture capable of receiving a sturdy nylon tape having an integrated gear rack, and on one end thereof a ratchet within a small open case.

4. The Chain Cleaner according to claim 1, wherein said roller chain is adapted to connect a pedal crank to a rear sprocket of a bicycle.

5. The Chain Cleaner according to claim 1, wherein said sheet further comprises a slit adapted to provide a bilateral elastic separation of said sheet along said chain line so that said chain is capable of being inserted in said slot through said slit when separated.

6. The Chain Cleaner according to claim 4, wherein said bicycle further includes a plurality of rear sprockets and a derailleur assembly, and said attaching means is adapted to attach to a cage member of said derailleur assembly.

7. The Chain Cleaner according to claim 5, wherein said Cleaner further comprises at least one transverse retainer clip attached to said sheet adapted to retain said separation in a closed position so that said chain is secured within said slot.

8. Chain Cleaner according to claim 5, wherein said attaching means is an aperture positioned adjacent to said leading edge, and said slit extends along said chain line from a proximal edge of said aperture through said trailing edge of said sheet so that said sheet is capable of forming a Y-shaped compressible separation.

9. The Chain Cleaner according to claim 7, wherein said clip retainer comprises a generally C-shaped member, and said sheet further includes at least two oppositely aligned recesses in sidewalls of said sheet, said recesses adapted for receiving a clamping edge of said clip.

10. Chain Cleaner according to claim 6, wherein said derailleur includes a lower tension pulley adapted to adjust a tension on the chain as a differently-sized sprockets are selected, and said sheet is attached to said derailleur cage in a spaced relationship above said tension pulley.

11. The Chain Cleaner according to claim 6, wherein said derailleur includes a lower tension pulley adapted to adjust a tension on the chain as a differently-sized sprockets are selected, and said sheet is attached to said derailleur cage in a spaced relationship below said tension pulley.

12. A bicycle chain cleaner capable of cleaning dirt and debris from a roller chain of a bicycle when pedaling, comprising:

(a) a fluoropolymer sheet having a leading and a trailing edge, upper and lower surfaces, and a bilateral axis defining a chain line extending from said leading to said trailing edge;

(b) a first clear slot positioned in said sheet adjacent to said trailing edge, said slot having a length and a width at least equal to a respective height and width of the bicycle chain to be cleaned so that said roller chain is capable of biased directional travel against said lower and upper surfaces, and through said slot, along said chain line; and (c) a pivotal attaching assembly positioned adjacent to said leading edge, said assembly including an aperture in said sheet capable of receiving a sturdy nylon tape, wherein said nylon tape includes an integrated gear rack, and on one end thereof a ratchet having an open case so that said nylon tape is capable of securing said sheet to said bicycle in axial alignment with said chain line.

13. The Bicycle Chain Cleaner according to claim 12, wherein said sheet further comprises a through slit adapted to provide a bilateral elastic separation of said sheet along said chain line so that said chain is capable of being inserted in said slot through said slit when separated.

14. The Bicycle Chain Cleaner according to claim 13, wherein said cleaner further comprises at least one transverse retaining clip adapted to retain said separation in a closed position so that said chain is secured within said slot.

15. Bicycle Chain Cleaner according to claim 12, wherein said bicycle further includes a plurality of rear sprockets and a derailleur assembly, and said attaching means is attached to a cage member of said derailleur assembly.

16. The Bicycle Chain Cleaner according to claim 13, wherein slit extends along said chain line from a proximal edge of said aperture through said trailing edge of said sheet so that said sheet is capable of a Y-shaped bilateral separation.

17. The Bicycle Chain Cleaner according to claim 14, wherein said sheet includes at least two oppositely aligned recesses in sidewalls of said sheet, and said clip retainer is a generally C-shaped clamping member adapted for fitment within said recesses.

18. The Bicycle Chain Cleaner according to claim 15, wherein said derailleur includes a lower tension pulley adapted to adjust a tension on the chain as a differently-sized sprockets are selected, and said sheet is attached to said derailleur cage in a spaced relationship above said tension pulley.

19. The Bicycle Chain Cleaner according to claim 15, wherein said derailleur includes a lower tension pulley adapted to adjust a tension on the chain as a differently-sized sprockets are selected and said sheet is attached to said derailleur cage is a spaced relationship below said tension pulley.

* * * * *